United States Patent
Delisle et al.

(10) Patent No.: US 9,731,781 B2
(45) Date of Patent: *Aug. 15, 2017

(54) ENDLESS TRACK FOR TRACTION OF A VEHICLE, WITH ENHANCED ELASTOMERIC MATERIAL CURING CAPABILITY

(71) Applicant: Camoplast Solideal Inc., Sherbrooke (CA)

(72) Inventors: Marc Delisle, Magog (CA); Jean-Luke Noël, Shefford (CA); Martin Lajoie, Waterville (CA)

(73) Assignee: CAMSO INC., Sherbrooke (CA)

( * ) Notice: Subject to any disclaimer, the term of this patent is extended or adjusted under 35 U.S.C. 154(b) by 685 days.

This patent is subject to a terminal disclaimer.

(21) Appl. No.: 14/137,235

(22) Filed: Dec. 20, 2013

(65) Prior Publication Data

US 2014/0103705 A1    Apr. 17, 2014

Related U.S. Application Data

(63) Continuation-in-part of application No. 12/837,633, filed on Jul. 16, 2010, now Pat. No. 8,628,152.
(Continued)

(51) Int. Cl.
*B62D 55/24* (2006.01)
*B29C 35/04* (2006.01)
(Continued)

(52) U.S. Cl.
CPC ............ *B62D 55/24* (2013.01); *B29C 35/049* (2013.01); *B62D 55/244* (2013.01); *B29K 2021/00* (2013.01); *B29L 2031/7094* (2013.01)

(58) Field of Classification Search
CPC ...... B62D 55/00; B62D 55/08; B62D 55/018; B62D 55/24; B62D 55/244
(Continued)

(56) References Cited

U.S. PATENT DOCUMENTS

| | | | |
|---|---|---|---|
| 3,463,562 A | 8/1969 | Svensson | |
| 3,779,617 A | 12/1973 | Palmaer | |

(Continued)

FOREIGN PATENT DOCUMENTS

| | | | |
|---|---|---|---|
| JP | 11216783 A | 8/1999 | |
| WO | 03008258 A | 1/2003 | |

OTHER PUBLICATIONS

Track belt options, <http://salesmanual.deere.com/sales/salesmanual/en_NA/tractors/2007/feature/undercarriage_and_tracks/8030t/8030t_track_belt_options.html>, Last Updated : Jun. 21, 2006; 4 pages.
(Continued)

*Primary Examiner* — Jason Bellinger
(74) *Attorney, Agent, or Firm* — Senniger Powers LLP

(57) ABSTRACT

An endless track for traction of a vehicle, such as a construction vehicle, an agricultural vehicle, a forestry vehicle or a military vehicle. The endless track has an enhanced elastomeric material curing capability. In one embodiment, each of a plurality of elastomeric projections of the endless track, such as guide/drive projections or traction projections, comprises elastomeric material defining a cavity to enhance a curing process during manufacturing of the endless track. The cavity may be shaped such that, during the curing process, a heat conductor positioned in the cavity conducts heat from the heat conductor to the elastomeric material of the projection.

33 Claims, 16 Drawing Sheets

Related U.S. Application Data

(60) Provisional application No. 61/226,514, filed on Jul. 17, 2009.

(51) Int. Cl.
*B29L 31/00* (2006.01)
*B29K 21/00* (2006.01)

(58) Field of Classification Search
USPC ............. 305/165–167, 173–175, 193–195
See application file for complete search history.

(56) References Cited

U.S. PATENT DOCUMENTS

| | | | |
|---|---|---|---|
| 5,447,365 | A | 9/1995 | Muramatsu et al. |
| 5,536,464 | A | 7/1996 | Muramatsu |
| 5,984,438 | A | 11/1999 | Tsunoda et al. |
| 6,079,802 | A | 6/2000 | Nishimura et al. |
| 6,299,264 | B1 | 10/2001 | Kautsch et al. |
| 8,628,152 | B2 * | 1/2014 | Delisle ............... B29C 35/049 |
| | | | 305/165 |

OTHER PUBLICATIONS

Abstract of JP11216783; Aug. 10, 1999.
European Search Report, EP2275326, dated Apr. 11, 2011, 8 pages.

\* cited by examiner

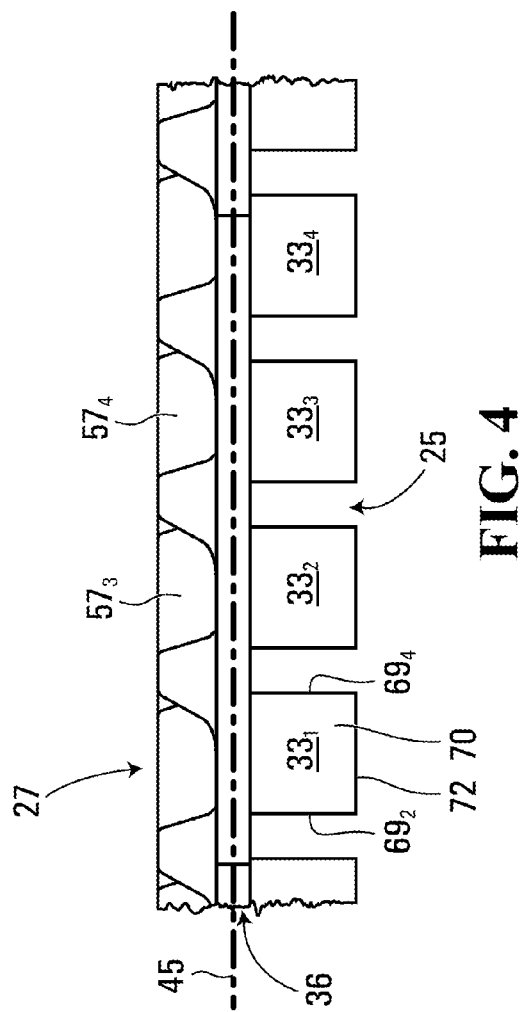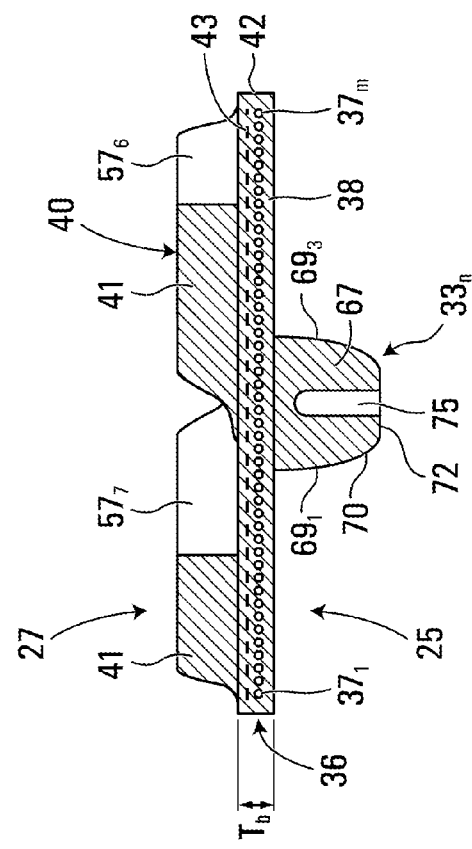

US 9,731,781 B2

ENDLESS TRACK FOR TRACTION OF A VEHICLE, WITH ENHANCED ELASTOMERIC MATERIAL CURING CAPABILITY

CROSS-REFERENCE TO RELATED APPLICATION

This application is a continuation-in-part and claims the benefit under 35 USC 120 of U.S. patent application Ser. No. 12/837,633 filed on Jul. 16, 2010 now U.S. Pat. No. 8,628,152, and hereby incorporated by reference herein, and claims the benefit under 35 USC 119(e) of U.S. Provisional Patent Application No. 61/226,514 filed on Jul. 17, 2009 and hereby incorporated by reference herein.

FIELD OF THE INVENTION

The invention relates to endless tracks for traction of vehicles operable in off-road conditions.

BACKGROUND

Certain vehicles, such as construction vehicles (e.g., loaders, bulldozers, excavators, etc.), agricultural vehicles (e.g., harvesters, combines, tractors, etc.) forestry vehicles (e.g., feller-bunchers, tree chippers, knuckleboom loaders, etc.) and military vehicles (e.g., combat engineering vehicles (CEVs), etc.) to name a few, may be equipped with elastomeric endless tracks which enhance their traction and floatation on soft, slippery and/or uneven grounds (e.g., soil, mud, sand, ice, snow, etc.) on which they operate.

In some cases, an elastomeric endless track may include certain parts that are significantly more voluminous than other parts. For example, the elastomeric endless track may include guide/drive projections (sometimes referred to as "guide/drive lugs") on its inner side or traction projections (sometimes referred to as "tread members") on its outer side that are thicker in one or more directions than its main body (sometimes referred to as a "carcass"). In such cases, when the endless elastomeric track undergoes a curing process during manufacturing, some of its elastomeric material can be undesirably undercured or overcured, for instance, by falling short of reaching a desired curing temperature in a given period of time, reaching an undesirably high temperature in a given period of time, and/or remaining at a high temperature for too long a period of time. In turn, this may have detrimental effects on properties and performance characteristics of the elastomeric endless track in its final state and/or may create inefficiencies in its manufacturing.

For these and other reasons, there is a need to improve elastomeric endless tracks for traction of vehicles.

SUMMARY OF THE INVENTION

According to one broad aspect, the invention provides an endless track for traction of a vehicle. The endless track comprises: a) a ground-engaging outer side for engaging the ground; and b) an inner side for facing a plurality of wheels of the vehicle. The inner side comprises a plurality of wheel-contacting projections for contacting at least one of the wheels, the wheel-contacting projections being spaced apart in a longitudinal direction of the endless track. Each wheel-contacting projection comprises: elastomeric material; and a cavity defined by the elastomeric material of the wheel-contacting projection, the cavity allowing a heat conductor to be positioned in the cavity during a curing process of the endless track to conduct heat from the heat conductor to the elastomeric material of the wheel-contacting projection.

According to another broad aspect, the invention provides an endless track for traction of a vehicle. The endless track comprises: a) a carcass comprising elastomeric material; b) a ground-engaging outer side for engaging the ground; and c) an inner side for facing a plurality of wheels of the vehicle, the inner side comprising a plurality of wheel-contacting projections for contacting at least one of the wheels, the wheel-contacting projections being spaced apart in a longitudinal direction of the endless track. Each wheel-contacting projection comprises: elastomeric material having an internal surface; and a cavity defined by the internal surface, the cavity being shaped such that the endless track has a thickness measured from the internal surface in each of at least one direction that is no greater than 1.5 times a thickness of the carcass.

According to another broad aspect, the invention provides an endless track for traction of a vehicle, The endless track comprises: a) a carcass comprising elastomeric material; b) a ground-engaging outer side for engaging the ground; and c) an inner side for facing a plurality of wheels of the vehicle, the inner side comprising a plurality of wheel-contacting projections for contacting at least one of the wheels, the wheel-contacting projections being spaced apart in a longitudinal direction of the endless track. Each wheel-contacting projection comprises: elastomeric material; and a cavity defined by the elastomeric material of the wheel-contacting projection, the cavity allowing all of the elastomeric material of the wheel-contacting projection to be correctly cured without having to overcure the elastomeric material of the carcass.

According to another broad aspect, the invention provides an endless track for traction of a vehicle. The endless track comprises: a) an inner side for facing a plurality of wheels of the vehicle; and b) a ground-engaging outer side for engaging the ground, the ground-engaging outer side comprising a plurality of traction projections spaced apart in a longitudinal direction of the endless track. Each traction projection comprises: elastomeric material; and a cavity defined by the elastomeric material of the traction projection, the cavity allowing a heat conductor to be positioned in the cavity during a curing process of the endless track to conduct heat from the heat conductor to the elastomeric material of the traction projection.

According to another broad aspect, the invention provides an endless track for traction of a vehicle. The endless track comprises: a) a carcass comprising elastomeric material; b) an inner side for facing a plurality of wheels of the vehicle; and c) a ground-engaging outer side for engaging the ground, the ground-engaging outer side comprising a plurality of traction projections spaced apart in a longitudinal direction of the endless track. Each traction projection comprises: elastomeric material having an internal surface; and a cavity defined by the internal surface, the cavity being shaped such that the endless track has a thickness measured from the internal surface in each of at least one direction that is no greater than 1.5 times a thickness of the carcass.

According to another broad aspect, the invention provides an endless track for traction of a vehicle. The endless track comprises: a) a carcass comprising elastomeric material; b) an inner side for facing a plurality of wheels of the vehicle; and c) a ground-engaging outer side for engaging the ground, the ground-engaging outer side comprising a plurality of traction projections spaced apart in a longitudinal direction of the endless track. Each traction projection comprises: elastomeric material; and a cavity defined by the elastomeric material of the traction projection, the cavity allowing all of the elastomeric material of the traction projection to be correctly cured without having to overcure the elastomeric material of the carcass.

According to another broad aspect, the invention provides a process for manufacturing an endless track for traction of a vehicle. The process comprises: a) placing a plurality of elastomeric projections of a side of the endless track into a mold, each elastomeric projection comprising elastomeric material that defines a cavity in which is positioned a heat conductor; and b) curing the elastomeric material of each elastomeric projection in the mold, the curing comprising heating the heat conductor positioned in the cavity of the elastomeric projection to conduct heat from the heat conductor to the elastomeric material of the elastomeric projection.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 2 to 5 respectively show a top view, a bottom view, a side elevation view, and a cross-sectional view of an endless track of the vehicle;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
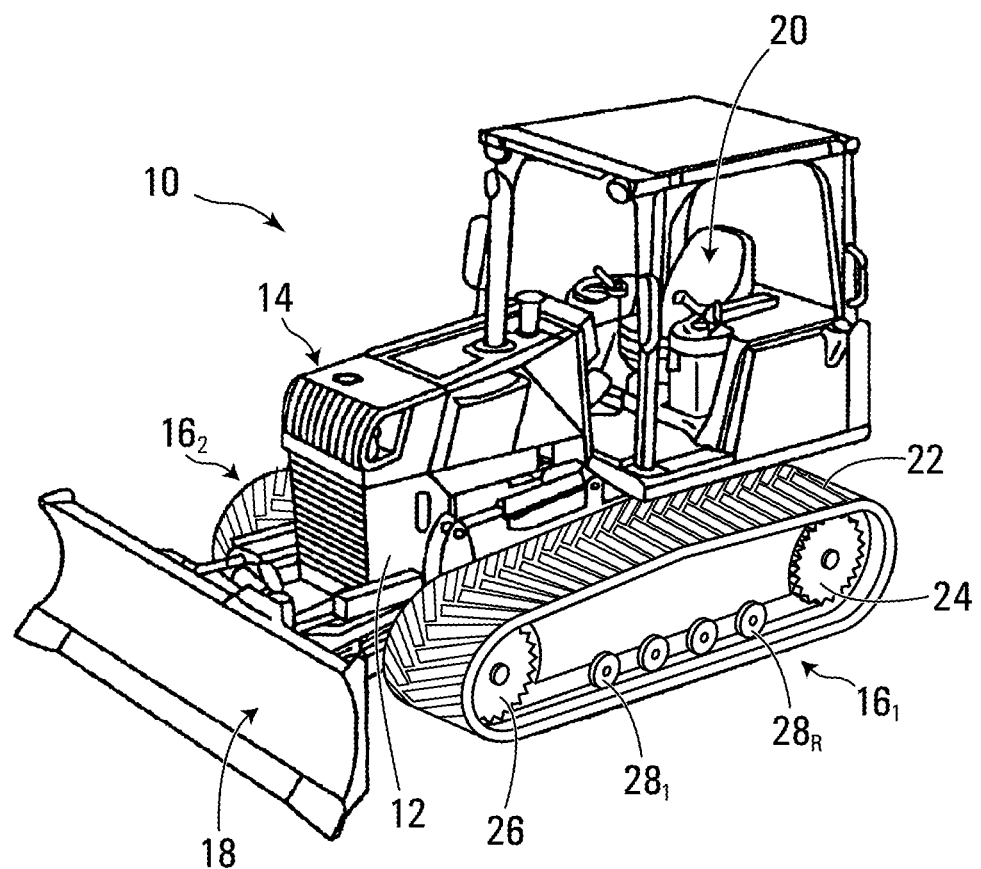
FIG. 1 shows an example of a vehicle in accordance with an embodiment of the invention.
Figure 3:
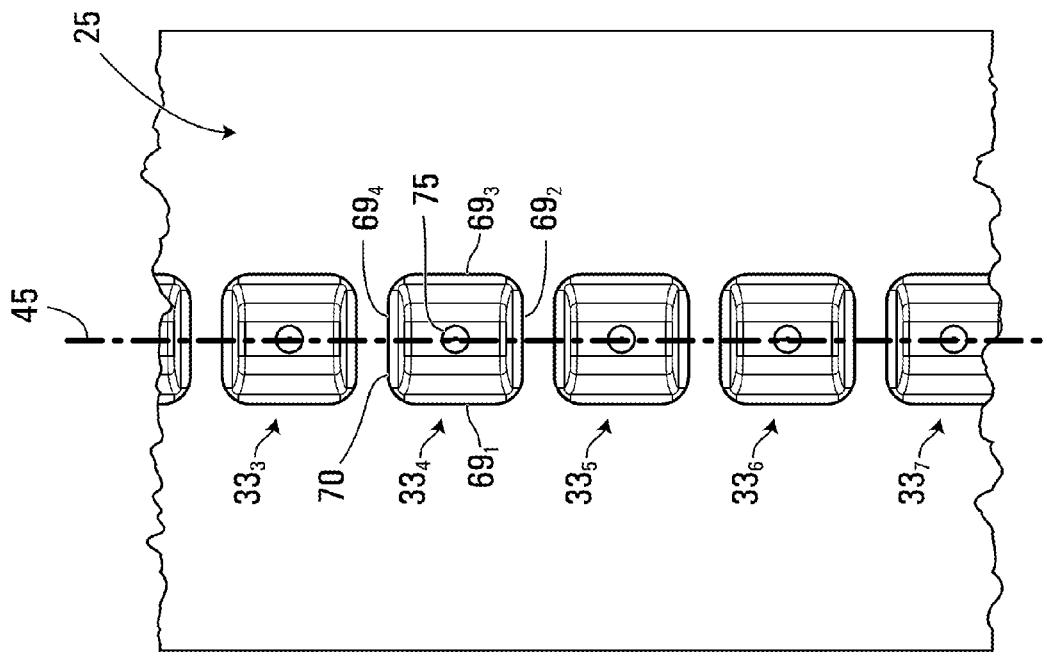
Figure 2:
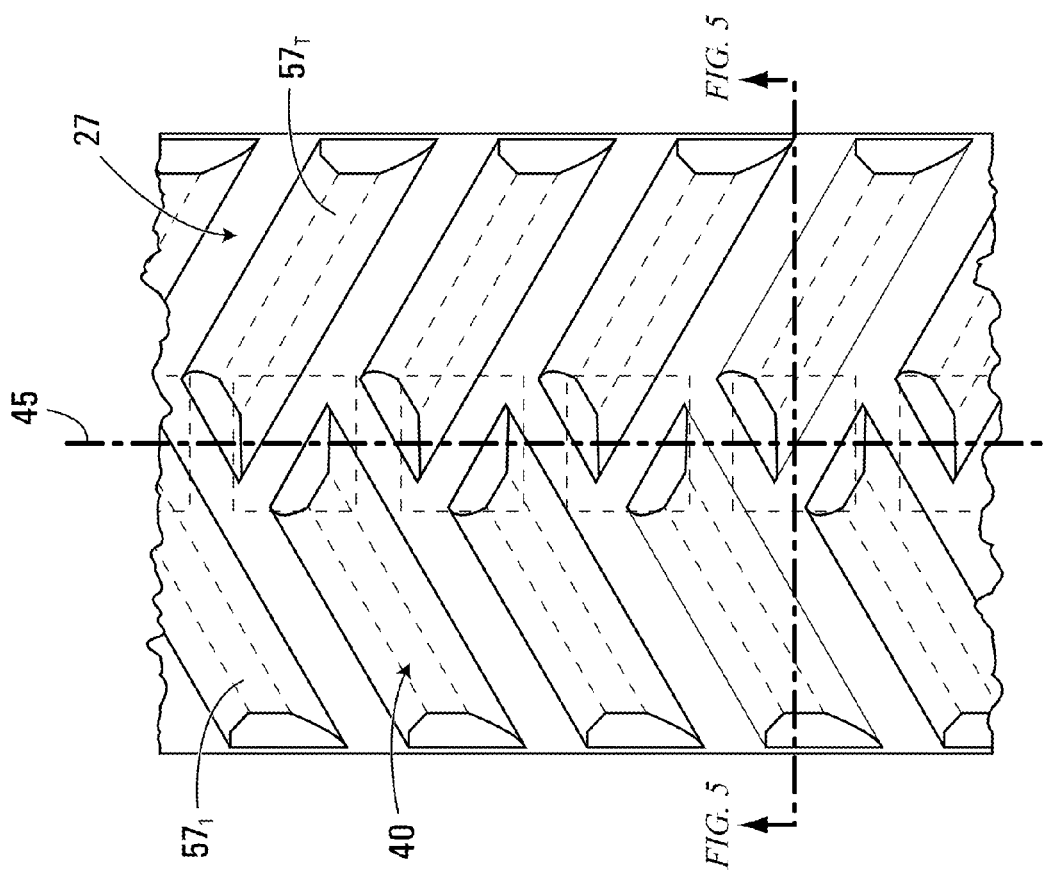
Figures 6A, 6B:
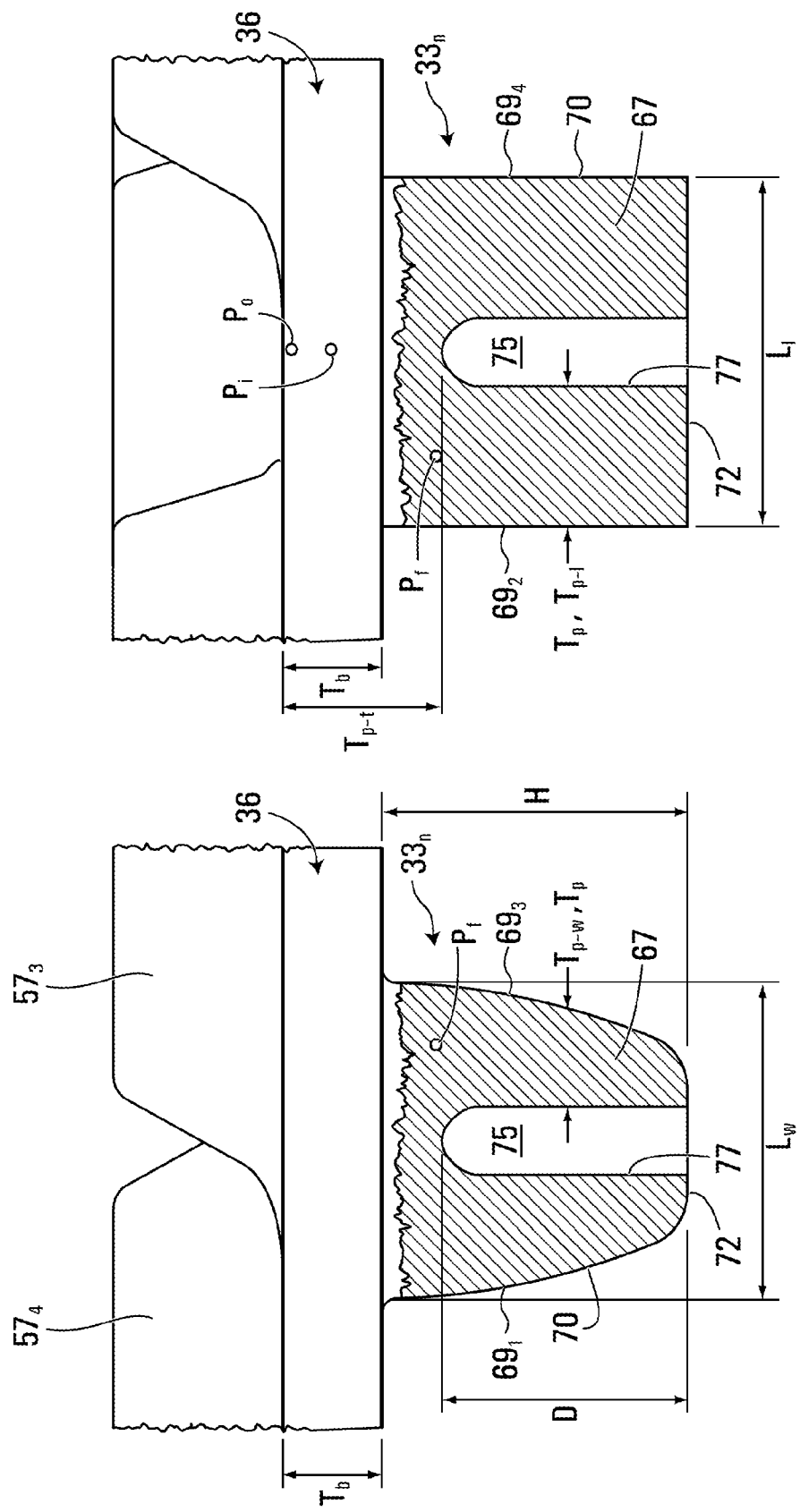
FIGS. 6A and 6B respectively show a partial cross-sectional side elevation view and a partial cross-sectional front view of a drive projection of the endless track.

FIG. 1 shows a vehicle 10 in accordance with an embodiment of the invention. In this embodiment, the vehicle 10 is a construction vehicle for performing construction work. More specifically, in this example, the construction vehicle 10 is a bulldozer. In other examples, the construction vehicle 10 may be a backhoe loader, a skid steer loader, an excavator, or any other type of construction vehicle.

The construction vehicle 10 comprises a frame 12 supporting a prime mover 14, a pair of track assemblies $16_1$, $16_2$, a working implement 18, and an operator cabin 20, which enable an operator to move the construction vehicle 10 on the ground to perform construction work.

The prime mover 14 provides motive power to move the construction vehicle 10. For example, the prime mover 14 may comprise an internal combustion engine and/or one or more other types of motors (e.g., electric motors, etc.) for generating motive power to move the construction vehicle 10. The prime mover 14 is in a driving relationship with each of the track assemblies $16_1$, $16_2$. That is, power derived from the prime mover 14 is transmitted to the track assemblies $16_1$, $16_2$ via a powertrain of the construction vehicle 10.

The working implement 18 is used to perform construction work. In this embodiment, the working implement 18 is a dozer blade that can be used to push objects and shove soil, debris or other material. In other embodiments, the working implement 18 may take on various other forms, such as a bucket, a backhoe, a fork, a grapple, a scraper pan, an auger, a saw, a ripper, a material handling arm, or any other type of construction working implement.

The operator cabin 20 is where the operator sits and controls the construction vehicle 10. More particularly, the operator cabin 20 comprises a set of controls that allow the operator to steer the construction vehicle 10 on the ground and operate the working implement 18.

The track assemblies $16_1$, $16_2$ propel the construction vehicle 10 on the ground. More particularly, in this embodiment, each track assembly $16_i$ comprises an endless track 22 disposed around a drive wheel 24, an idler wheel 26, and a plurality of roller wheels $28_1$-$28_R$.

The drive wheel 24 is rotatable by power produced by the prime mover 14 for driving the endless track 22 to propel the construction vehicle 10 on the ground. The idler wheel 26 and the roller wheels $28_1$-$28_R$ do not convert power supplied by the prime mover 14 to motive force, but rather guide the endless track 22 and/or maintain it under tension as it is driven by the drive wheel 24. As the endless track 22 is driven by the drive wheel 24, the roller wheels $28_1$-$28_R$ roll on a bottom run of the endless track 22 to apply it on the ground for traction.

The endless track 22 engages the ground to provide traction to the construction vehicle 10. With additional reference to FIGS. 2 to 5, 6A and 6B, the endless track 22 comprises an inner side 25 and a ground-engaging outer side 27. The inner side 25 faces the wheels 24, 26, $28_1$-$28_R$ and defines an inner area in which these wheels rotate. The ground-engaging outer side 27 engages the ground for traction of the construction vehicle 10. The endless track 22 has a longitudinal axis 45 defining a longitudinal direction of the endless track 22 (i.e., a direction generally parallel to the longitudinal axis 45) and transversal directions of the endless track 22 (i.e., directions transverse to the longitudinal axis 45), including a widthwise direction of the endless track 22 (i.e., a lateral direction generally perpendicular to the longitudinal axis 45).

The endless track 22 comprises an elastomeric body 36 underlying the inner side 25 and the ground-engaging outer side 27. In view of its underlying nature, the elastomeric body 36 can be referred to as a "carcass". The carcass 36 is elastomeric in that it comprises elastomeric material 38. In this case, a plurality of reinforcements 42, 43 are embedded in the elastomeric material 38.

The elastomeric material 38 allows the carcass 36 to elastically change in shape as the endless track 22 is driven by the drive wheel 24. The elastomeric material 38 can be any polymeric material with suitable elasticity. In this embodiment, the elastomeric material 38 includes rubber. Various rubber compounds may be used and, in some cases, different rubber compounds may be present in different areas of the carcass 36. In other embodiments, the elastomeric material 38 may include another elastomer in addition to or instead of rubber.

The reinforcement 42 comprises a plurality of reinforcing cables $37_1$-$37_M$ adjacent to one another. The reinforcing cables $37_1$-$37_M$ extend generally in the longitudinal direction of the endless track 22 to enhance strength in tension of the track 22 along its longitudinal direction. In this embodiment, each of the reinforcing cables $37_1$-$37_M$ is a cord or wire rope including a plurality of strands or wires. In other embodiments, each of the reinforcing cables $37_1$-$37_M$ may be another type of cable and may be made of any material suitably flexible longitudinally (e.g., fibers or wires of metal, plastic or composite material). For its part, the reinforcement 43 may comprise a layer of reinforcing cables or a layer of reinforcing fabric. Such reinforcing cables may be cords or wire ropes including a plurality of strands or wires (e.g., of metal, plastic or composite material). Reinforcing fabric comprises pliable material made usually by weaving, felting, or knitting natural or synthetic fibers. For example, a layer of reinforcing fabric may comprise a ply of reinforcing woven fibers (e.g., nylon fibers or other synthetic fibers). Various other types of reinforcements may be provided in the carcass 36 in other embodiments.

The ground-engaging outer side 27 comprises a tread pattern 40 to enhance traction on the ground. The tread pattern 40 comprises a plurality of traction projections $57_1$-$57_T$ (sometimes referred to as "traction lugs" or "tread members") distributed on the ground-engaging outer side 27. In this embodiment, each of the traction projections $57_1$-$57_T$ has an elongated shape and is angled (i.e., defines an acute angle θ) relative to the longitudinal direction of the endless track 22. The traction projections $57_1$-$57_T$ may have various other shapes in other examples (e.g., curved shapes, shapes with straight parts and curved parts, etc.).

In this embodiment, each of the traction projections $57_1$-$57_T$ is an elastomeric traction projection that comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of each of the traction projections $57_1$-$57_T$. In other embodiments, the elastomeric material 41 may include another elastomer in addition to or instead of rubber.

The inner side 25 of the endless track 22 contacts the drive wheel 24 which imparts motion to the endless track 22. The inner side 25 also contacts the idler wheel 26 and the roller wheels $28_1$-$28_R$ which help to guide the endless track 22 and maintain it under tension as it is driven by the drive wheel 24.

In this embodiment, the inner side 25 comprises a plurality of wheel-contacting projections $33_1$-$33_N$ that contact one or more of wheels 24, 26 $28_1$-$28_R$ and are used to do at least one of driving (i.e., imparting motion to) the track 22 and guiding the track 22. In that sense, the wheel-contacting projections $33_1$-$33_N$ can be referred to as "drive/guide projections", meaning that each drive/guide projection is used to do at least one of driving the track 22 and guiding the track 22. Also, such drive/guide projections are sometimes referred to as "drive/guide lugs". The wheel-contacting projections $33_1$-$33_N$ are spaced apart in the longitudinal direction of the track section $50_j$.

More particularly, in this embodiment, the wheel-contacting projections $33_1$-$33_N$ are drive projections for driving the endless track 22 around the wheels 24, 26, $28_1$-$28_R$. The drive projections $33_1$-$33_N$, which for ease of reading will be referred to as "drive lugs", interact with the drive wheel 24 to impart motion to the endless track 22. In this example, the drive wheel 24 comprises a drive sprocket including teeth or bars and the drive lugs $33_1$-$33_N$ interact with the teeth or bars of the drive wheel 24 in order to cause the endless track 22 to be moved around the wheels 24, 26, $28_1$-$28_R$. The drive lugs $33_1$-$33_N$ may also serve to guide the endless track 22 as it is driven around the wheels 24, 26, $28_1$-$28_R$.

Each drive lug $33_n$ has a periphery 70. In this embodiment, the periphery 70 includes a top surface 72 and four (4) side surfaces $69_1$-$69_4$ that extend downwardly from the top surface 72. The side surface $69_2$, $69_4$ are opposite one another and spaced apart in the longitudinal direction of the endless track 22, while the side surfaces $69_1$, $69_3$ are opposite one another and spaced apart in the widthwise direction of the endless track 22. The periphery 70 defines overall dimensions of the drive lug $33_n$, namely a height H, a longitudinal dimension $L_l$ in the longitudinal direction of the endless track 22 and a widthwise dimension $L_w$ in the widthwise direction of the endless track 22. The periphery 70 may have various other shapes in other embodiments (e.g., a different number of side surfaces, one or more side surfaces that are straight or have a different curvature, etc.).

Each drive lug $33_n$ is an elastomeric drive lug that comprises elastomeric material 67. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the drive lug $33_n$. In other embodiments, the elastomeric material 67 may include another elastomer in addition to or instead of rubber.

In this embodiment, the drive lugs $33_1$-$33_N$ are designed such that rubber of the endless track 22, including the rubber 38 of the carcass 36 and the rubber 67 of each of the drive lugs $33_1$-$33_N$, is efficiently cured (e.g., vulcanized) when the endless track 22 is manufactured, even though the drive lugs $33_1$-$33_N$ are more voluminous than other parts of the endless track 22. In particular, in this example, each drive lug $33_n$ is designed such that its rubber 67 and the rubber 38 of the carcass 36 is efficiently cured, even though each of its height H, longitudinal dimension $L_l$ and widthwise dimension $L_w$ is significantly greater than (e.g., in this case more than twice) a thickness $T_b$ of the carcass 36. This can avoid situations where some of the rubber of the endless track 22 would be undesirably undercured or overcured, such as situations where some of the rubber of the endless track 22 would fall short of reaching a desired curing temperature in a given period of time, some of the rubber of the endless track 22 would reach an undesirably high temperature in a given period of time, and/or some of the rubber of the endless track 22 would remain at a high temperature for too long a period of time.

More particularly, in this embodiment, the rubber 67 of each drive lug $33_n$ has an internal surface 77 defining an internal space 75 unoccupied by the rubber 67 to enhance a curing process during manufacturing of the endless track 22.

The internal space 75, which will be referred to as a "cavity", may be shaped in various ways to enhance the curing process.

For example, the cavity 75 may be shaped such that the endless track 22 has a thickness $T_p$ measured from the internal surface 77 of the rubber 67 of the drive lug $33_n$ in each of one or more directions that is no greater than N times the thickness $T_b$ of the carcass 36 ($T_p \leq NT_b$), where N is sufficiently small to enhance the curing process. For instance, in some embodiments, N may be no greater than 1.5, in some cases no greater than 1.4, in some cases no greater than 1.3, in some cases no greater than 1.2, in some cases no greater than 1.1, and in some cases equal to or less than 1.0. This may apply to one, in some cases two, and in some cases all three of: a thickness $T_{p-l}$ of the rubber 67 of the drive lug $33_n$ measured from the internal surface 77 in the longitudinal direction of the endless track 22; a thickness $T_{p-w}$ of the rubber 67 of the drive lug $33_n$ measured from the internal surface 77 in the widthwise direction of the endless track 22; and a thickness $T_{p-t}$ of the endless track 22 measured from the internal surface 77 in a thickness direction of the endless track 22 (i.e., a direction normal to both the longitudinal direction and the widthwise direction of the endless track 22). In this case, the thickness $T_{p-t}$ is a thickness of the rubber 67 of the drive lug $33_n$ and of the rubber 38 of the carcass 36 measured from the internal surface 77 in the thickness direction of the endless track 22.

Such similar thicknesses can allow heat conduction paths of similar lengths in the rubber 67 of the drive lug $33_n$ and the rubber 38 of the carcass 36 during the curing process. In turn, this can allow the rubber 67 of the drive lug $33_n$ and the rubber 38 of the carcass 36 to exhibit respective temperature profiles tending to match one another over time during the curing process. For instance, a point $P_f$ of the rubber 67 of the drive lug $33_n$ which is farthest, in the longitudinal direction and the widthwise direction of the track 22, from a heated surface in contact with the rubber 67 of the drive lug $33_n$ during the curing process may exhibit a temperature variation over time during the curing process that is similar to that exhibited by an innermost point $P_i$ of the rubber 38 of the carcass 36. In this case, the point $P_f$ is located away from the internal surface 77 of the rubber 67 of the drive lug $33_n$ since, as discussed later, a heated surface is in contact with the internal surface 77 during the curing process. For example, in some embodiments, the temperature of the point $P_f$ of the rubber 67 of the drive lug $33_n$ may remain within 30%, in some cases within 25%, in some cases within 20%, and in some cases within 15% of the temperature of the innermost point $P_i$ of the rubber 38 of the carcass 36 during the curing process.

As another example, the cavity 75 may have a shape allowing all of the rubber 67 of the drive lug $33_n$ to be correctly cured without having to overcure the rubber 38 of the carcass 36. All of the rubber 67 of the drive lug $33_n$ can be deemed to be correctly cured when the point $P_f$ of the rubber 67 of the drive lug $33_n$ (which is farthest, in the longitudinal direction and the widthwise direction of the track 22, from a heated surface in contact with the rubber 67 of the drive lug $33_n$ during the curing process) is in a state of cure in which it exhibits a desired property.

For instance, in some embodiments, all of the rubber 67 of the drive lug $33_n$ can be deemed to be correctly cured when the point $P_f$ of the rubber 67 of the drive lug $33_n$ is in a state of cure which corresponds to at least 85%, in some cases at least 90%, and in some cases at least 95% of an ultimate state of cure of the rubber 67. The ultimate state of cure of the rubber 67 is a state of cure in which a given property of the rubber 67 is optimum. For instance, in this case, the property considered is the tensile strength of the rubber 67 of the drive lug $33_n$. The state of cure at the point $P_f$ of the rubber 67 of the drive lug $33_n$ when the endless track 22 is ready for use can be evaluated, in terms of a percentage of the ultimate state of cure at that point, as $TS_0/TS_{max} \times 100$, where: $TS_0$ is the value of the tensile strength of the point $P_f$ of the rubber 67 of the drive lug $33_n$ when the endless track 22 is ready for use, as evaluated by taking a sample of the rubber 67 including the point $P_f$ and measuring the value $TS_0$ of the tensile strength at the point $P_f$; and $TS_{max}$ is the maximum value attainable for the tensile strength of the point $P_f$ of the rubber 67. Various testing methods may be used to evaluate the tensile strength of the rubber 67 and/or the state of cure of the rubber 67 (e.g., ASTM D412 or ISO 37, ASTM D2084 or ISO 3417)

In other embodiments, all of the rubber 67 of the drive lug $33_n$ can be deemed to be sufficiently cured when the point $P_f$ of the rubber 67 of the drive lug $33_n$ is in a state of cure in which it exhibits a compression set no greater than 30%, when measured according to ASTM D395 Test Method B. In contrast, all of the rubber 67 of the drive lug $33_n$ can be deemed to not be correctly cured when the point $P_f$ of the rubber 67 of the drive lug $33_n$ is in a state of cure in which it exhibits a compression set greater than 30%, when measured according to ASTM D395 Test Method B.

Overcuring the rubber 38 of the carcass 36 refers to a condition resulting from curing the rubber 38 longer than necessary to achieve full development of physical strength of the rubber 38. For example, overcuring the rubber 38 of the carcass 36 occurs if the rubber 38 is subjected to an undesirably high temperature or too long a period of time at a certain temperature, resulting in a decline in certain physical properties of the rubber 38. For instance, in some embodiments, the rubber 38 of the carcass 36 can be deemed to be overcured when the tensile strength of the rubber 38 of the carcass 36 at an outermost point $P_o$ of the rubber 38 of the carcass 36 has a value less than its maximum value. The value of the tensile strength of the rubber 38 of the carcass 36 at the point $P_o$ when the endless track 22 is ready for use and the maximum value of the tensile strength at the point $P_o$ can be measured by taking a sample of the rubber 38 of the carcass 36 including the point $P_o$ and using a testing method such as that discussed above in respect of measuring the value of the tensile strength at the point $P_f$ of the rubber 67 of the drive lug $33_n$. In other embodiments, the rubber 38 of the carcass 36 can be deemed to be overcured when the outermost point $P_o$ of the rubber 38 of the carcass 36 is in a state of cure in which it exhibits a compression set greater than 30%, when measured according to ASTM D395 Test Method B.

As yet another example, the cavity 75 may have a shape allowing all of the rubber 67 of the drive lug $33_n$ to reach a desired curing temperature of the rubber 38 of the carcass 36 without having to overcure the rubber 38 of the carcass 36. All of the rubber 67 of the drive lug $33_n$ can be deemed to have reached the desired curing temperature of the rubber 38 of the carcass 36 when the point $P_f$ of the rubber 67 of the drive lug $33_n$ reaches the desired curing temperature of the rubber 38 of the carcass 36.

As yet another example, the cavity 75 may be shaped such that the curing process is significantly shorter than if the cavity 75 was omitted but the drive lug $33_n$ was otherwise identical (i.e., the cavity 75 was entirely occupied by rubber 67). For instance, in some embodiments, the curing process may take a period of time that is at least 15%, in some cases at least 20% and in some cases at least 25% shorter than if the cavity 75 of each drive lug $33_n$ was omitted but the drive lug $33_n$ was otherwise identical.

The above examples of how the cavity 75 may be shaped to enhance the curing process are presented for illustrative purposes since the cavity 75 may be shaped in various other ways to enhance the curing process.

In this embodiment, the cavity 75 extends inwardly from the periphery 70 of the drive lug $33_n$. More particularly, in this example, the cavity 75 extends generally vertically from the top surface 72 of the drive lug $33_n$. The cavity 75 has a depth D which may take on various values depending on the overall dimensions of the drive lug $33_n$. For instance, in some cases, a ratio D/H of the depth D of the cavity 75 to the height H of the drive lug $33_n$ may be at least 25%, in some cases at least 30%, in some cases at least 35%, in some cases at least 40%, in some cases at least 45%, and in some cases at least 50%. In this example, the depth D is about 80% of the height H of the drive lug $33_n$.

As further discussed below, in addition to reducing a quantity of rubber to be cured, in this embodiment, the cavity 75 of each drive lug $33_n$ allows heat from a heat source to be conducted inside the drive lug $33_n$ during the curing process. Specifically, the cavity 75 is shaped such that, during the curing process, a heat conductor located in the cavity 75 is heated and transfers heat by conduction to the rubber 67 of the drive lug $33_n$ via the internal surface 77 of the rubber 67. The heat conductor may comprise any metallic or other solid object that can transfer heat by conduction to the rubber 67 of the drive lug $33_n$ via the internal surface 77 of the rubber 67.

Figure 7:
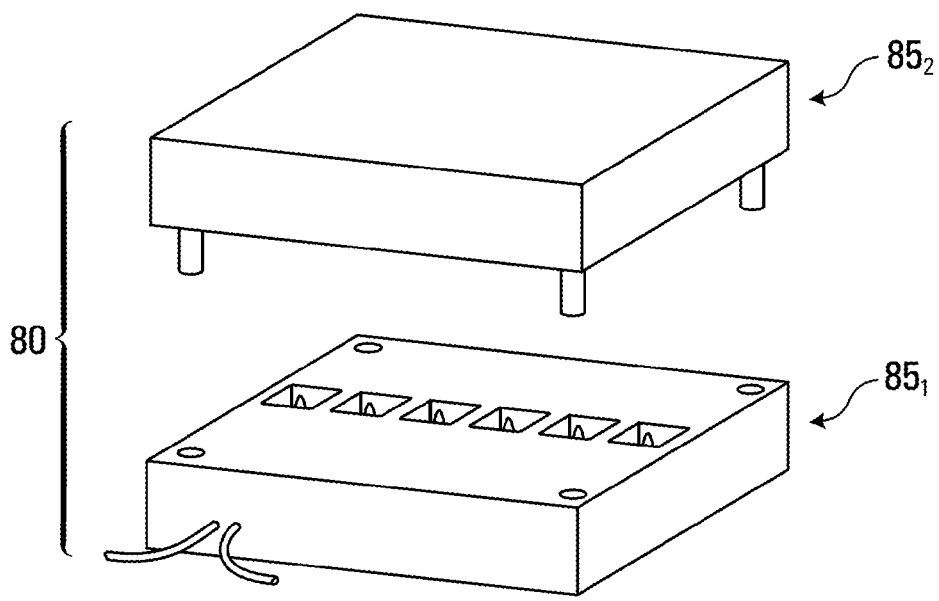
FIGS. 7 and 8 show an embodiment of a mold used in an example of a process for manufacturing the endless track.
Figure 8:
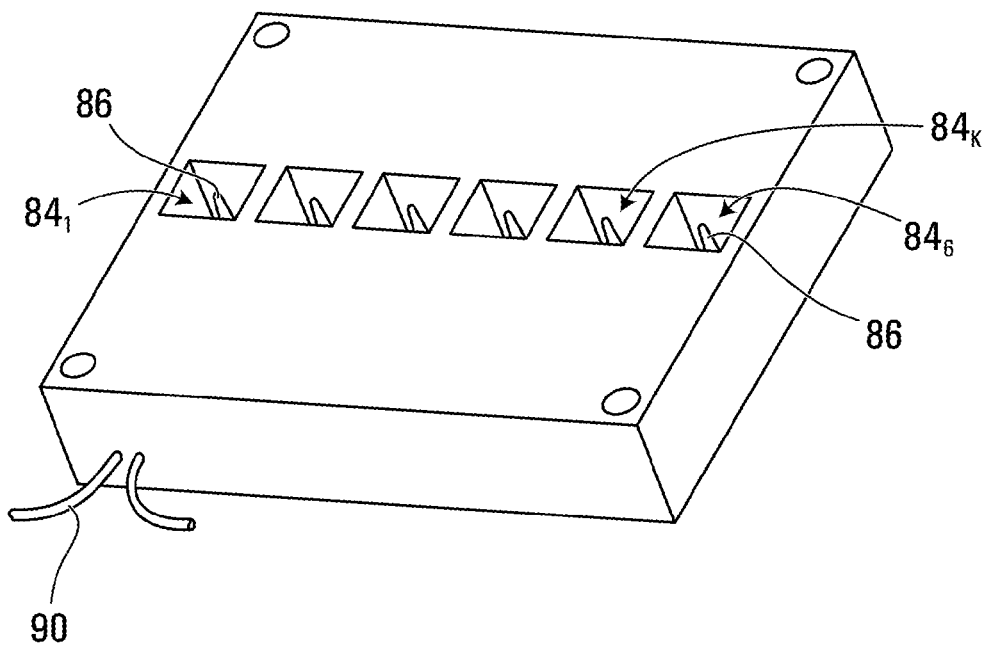
Figure 9A:
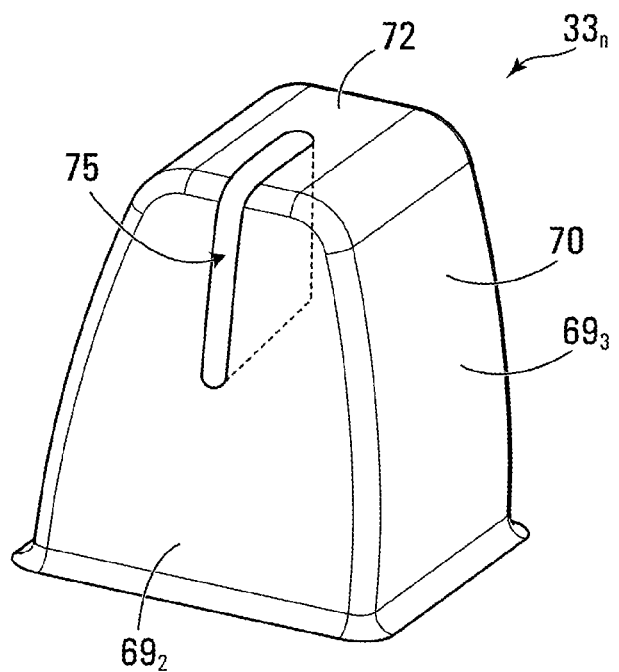
FIGS. 9A to 9E show examples of other configurations of an inner space of the drive projection in other embodiments.
Figure 9B:
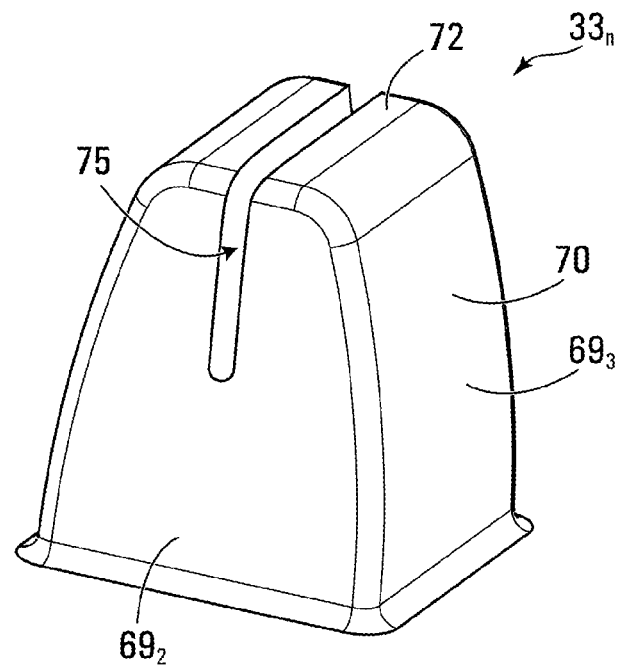
Figure 9C:
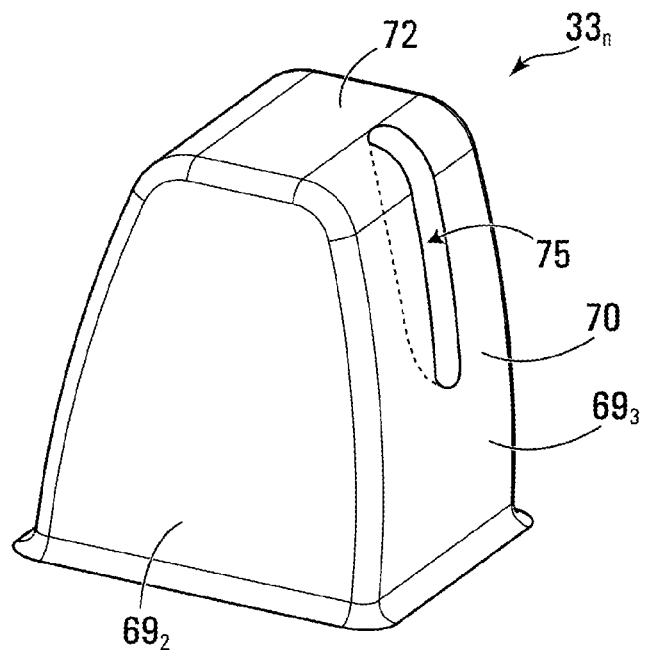
Figure 9D:
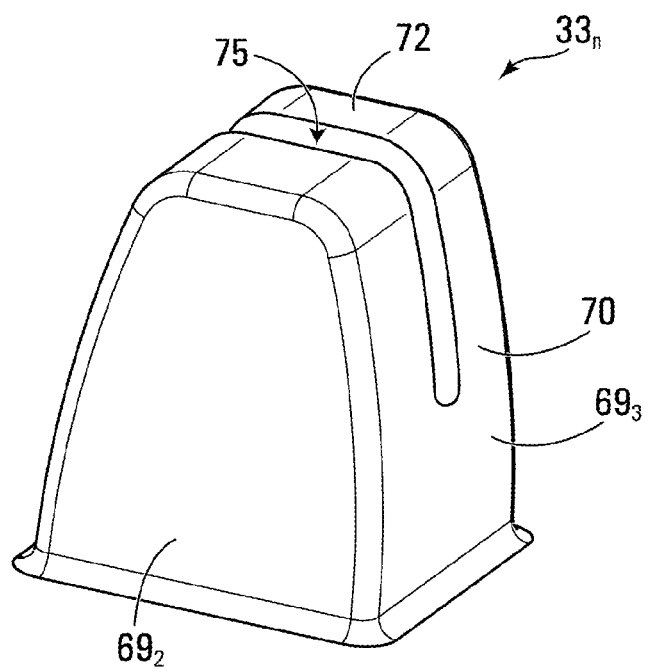
Figure 9E:
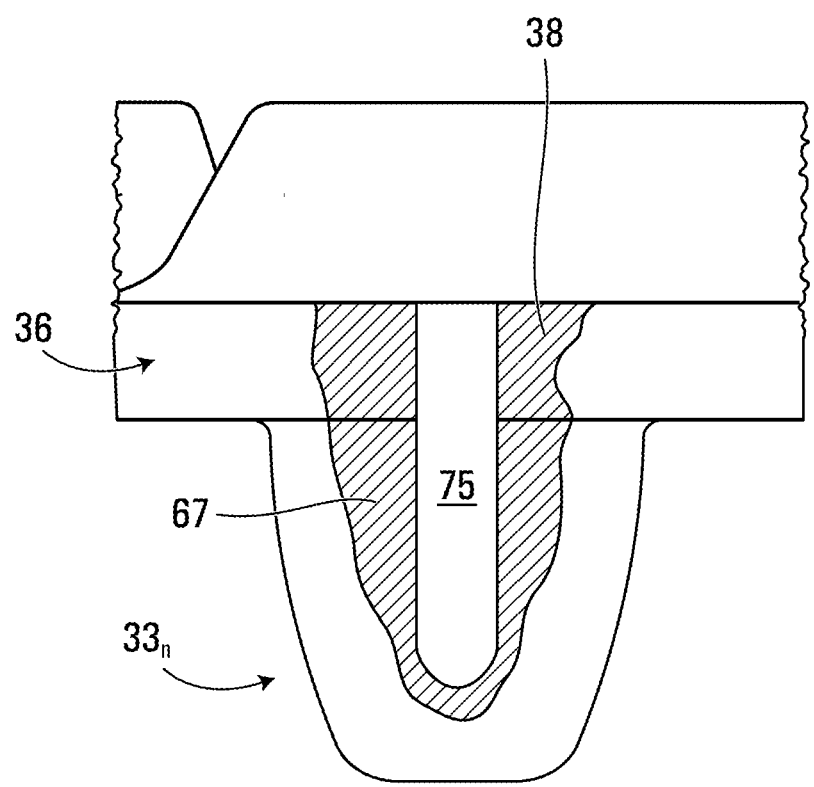

With additional reference to FIGS. 7 and 8, an example of a process for manufacturing the endless track 22 will be discussed. In this example, the endless track 22 is manufactured by molding it in sections in a mold 80.

The drive lugs $33_1$-$33_N$ are prepared for the molding operation. More particularly, in this example, the rubber 67 of each drive lug $33_n$ is molded in a suitably-shaped mold to form the drive lug $33_n$. The cavity 75 may be molded at the same time in this mold or may be formed afterwards (e.g., by drilling it into the drive lug $33_n$).

Some of the drive lugs $33_1$-$33_N$ are then placed in the mold 80. More particularly, in this example, six (6) of the drive lugs $33_1$-$33_N$ are placed in respective cavities $84_1$-$84_6$ of a first part $85_1$ of the mold 80. Each cavity $84_k$ has a heat conductor 86 projecting therein and received in the cavity 75 of the drive lug $33_n$. During a curing process discussed below, the heat conductor 86 is heated and transfers heat by conduction to the rubber 67 of the drive lug $33_n$ via the internal surface 77 of the rubber 67.

The carcass 36 of the endless track 22 is provided in the mold 80. In this example, the rubber 38 and the reinforcements 42, 43 of the carcass 36 have been previously assembled by layering a plurality of sheets on one another. These sheets include sheets of rubber and sheets of reinforcing fabric and/or reinforcing cables. In some cases, each sheet of reinforcing fabric or reinforcing cables may include rubber in which is embedded the reinforcing fabric or reinforcing cables. The sheets used to make the carcass 36 may have been previously produced using various processes (e.g., calendering). Collectively, the sheets of rubber and, if present, the rubber of the sheets of reinforcing fabric and/or reinforcing cables will, upon curing, form part of the rubber 38 of the carcass 36. The reinforcing cables $37_1$-$37_M$ have also been previously placed at an appropriate position relative to the sheets used to make the carcass 36.

The traction projections $57_1$-$57_T$ are prepared for the molding operation. More particularly, in this example, rubber, including the rubber 41 of the traction projections $57_1$-$57_T$ of the tread pattern 55, is placed into the mold 80 to form the ground-engaging outer side 27 of the track 22.

The mold 80 is then closed by moving its first part $85_1$ and a second part $85_2$ thereof towards one another. Heat and pressure are applied to the mold 80 to consolidate the components of the endless track 22 inside the mold 80, including curing their rubber. More particularly, in this embodiment, the mold 80 is heated by injecting high-temperature steam via conduits 90 linked to the mold 80. Pressure is applied by pressing the first and second parts $85_1$, $85_2$ of the mold 80 on one another using a press (e.g., a hydraulic press). The mold 80 may be heated to various temperatures and may be subjected to various levels of pressure, depending on the material properties and desired performance characteristics of the endless track 22.

The rubber of the endless track 22 that is in the mold 80 undergoes a curing process due to the heat applied to the mold 80. As part of this curing process, the heat conductor 86 received in the cavity 75 of each drive lug $33_n$ is heated. In this example, the heat conductor 86 received in the cavity 75 of the drive lug $33_n$ is heated by the high-temperature steam in the conduits 90. For instance, a conduit may run inside the heat conductor 86 to heat it and/or the heat conductor 86 may be heated by conduction of heat from a contiguous heated part of the mold 80 from which it projects. The heat conductor 86 transfers heat by conduction to the rubber 67 of the drive lug $33_n$ via the internal surface 77 of the rubber 67. This helps to efficiently cure the rubber of the endless track 22, including the rubber 67 of each of the drive lugs $33_1$-$33_N$ and the rubber 38 of the carcass 36, even though the drive lugs $33_1$-$33_N$ are more voluminous than the carcass 36.

Upon allowing sufficient time for consolidation of the carcass 36, the drive lugs $33_1$-$33_N$, and the traction projections $57_1$-$57_T$, including curing their rubber, the mold 80 is opened and the endless track 22 removed therefrom. One or more additional operations (e.g., trimming) may then be performed on the endless track 22 to put it in its final state.

Although this example illustrates one possible process and equipment to make the endless track 22, the endless track 22 may be made using various other processes and/or equipment in other embodiments.

The endless track 22 and other components of the track assembly 16, may be configured in various other ways in other embodiments.

For example, the cavity 75 of each drive lug $33_n$ may be configured in various other ways in other embodiments. For instance, in other embodiments, the cavity 75 may be oriented or shaped differently (e.g., as a recess or slot) and/or may extend from another region of the periphery 70 of the drive lug $33_n$ (e.g., from one of its side surfaces $69_1$-$69_4$) or from a region of the endless track 22 other than the periphery 70 of the drive lug $33_n$ (e.g., through a portion of the carcass 36 adjacent the drive lug $33_n$). FIGS. 9A to 9E show examples of other configurations of the cavity 75 in other embodiments. For instance: in FIG. 9A, the cavity 75 extends inwardly from the side surface $69_2$ towards the side surface $69_4$ opposite to the side surface $69_2$ without reaching the side surface $69_4$; in FIG. 9B, the cavity 75 extends inwardly from the side surface $69_2$ towards, and in this case to, the side surface $69_4$ opposite to the side surface $69_2$; in FIG. 9C, the cavity 75 extends inwardly from the side surface $69_3$ towards the side surface $69_1$ opposite to the side surface $69_3$ without reaching the side surface $69_1$; and in FIG. 9D, the cavity 75 extends inwardly from the side surface 69₃ towards, and in this case to, the side surface 69₁ opposite to the side surface 69₃.

Figure 10B:
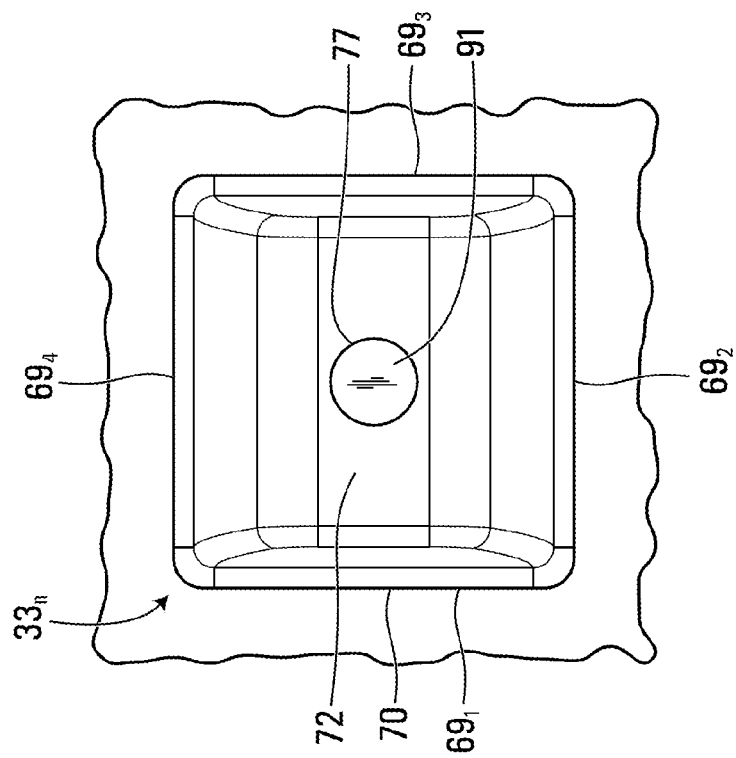
FIGS. 10A and 10B respectively show a partial cross-sectional view and a top view of a drive projection of the endless track in accordance with another embodiment of the invention.
Figure 10A:
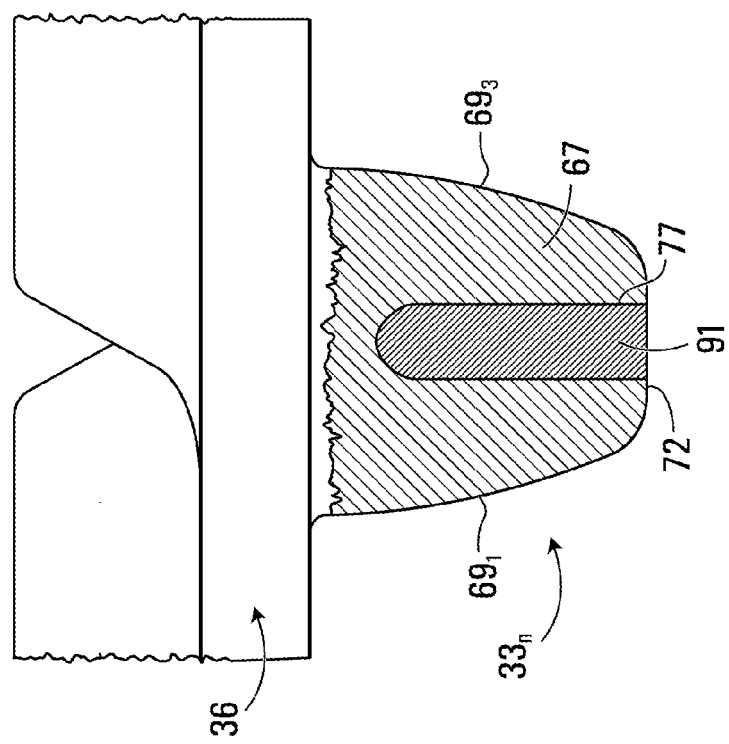

Instead of using the heat conductor 86 that is part of the mold 80, in other embodiments, as shown in FIGS. 10A and 10B, each drive lug 33ₙ may comprise a heat conductor 91 positioned in the cavity 75 of the drive lug 33ₙ prior to the drive lug 33ₙ being placed in the mold 80. The heat conductor 91 may comprise a metallic object (e.g., a metallic pin or other part) or some other component made of material having suitable heat conductivity. For instance, the heat conductor 91 may be placed in the cavity 75 after the cavity 75 is formed (e.g., by molding or drilling it) in the drive lug 33ₙ. Alternatively, the heat conductor 91 may be present while the cavity 75 is being formed (e.g., the rubber 67 of the drive lug 33ₙ may be molded around the heat conductor 91 when the drive lug 33ₙ is formed, in which case the heat conductor 91 actually forms the cavity 75 in which it is located). During the track molding operation, the heat conductor 91 is heated by heat conducted in the mold 80. For example, the heat conductor 91 may be in contact with a heated part of the mold 80 (e.g., a metallic heated part of the mold 80) that transfers heat to it by conduction. As it is heated, the heat conductor 91 transfers heat by conduction to the rubber 67 of the drive lug 33ₙ via the internal surface 77 of the rubber 67. Upon completion of the curing process and removal of the endless track 22 from the mold 80, the heat conductor 91 may remain in the drive lug 33ₙ as part of the track 22 in use. In some embodiments, in addition to enhancing curing of the rubber 67 of the drive lug 33ₙ, the heat conductor 91 may act as a structural reinforcement that reinforces the drive lug 33ₙ. Alternatively, upon completion of the curing process and removal of the endless track 22 from the mold 80, the heat conductor 91 may be removed from the drive lug 33ₙ so that it is not part of the track 22 in use.

While in some embodiments the cavity 75 of each drive lug 33ₙ may be left empty (i.e., hollow) when the endless track 22 is in use, in other embodiments, a component may be placed in the cavity 75 of the drive lug 33ₙ to fill or close it after the curing process is completed. For instance, such component may be filler material, a structural member, a cap or any other substance or part that can fill or close up the cavity 75. This may help to prevent undesirable matter or foreign objects from getting trapped in the cavity 75 during use of the endless track 22.

Figure 11:
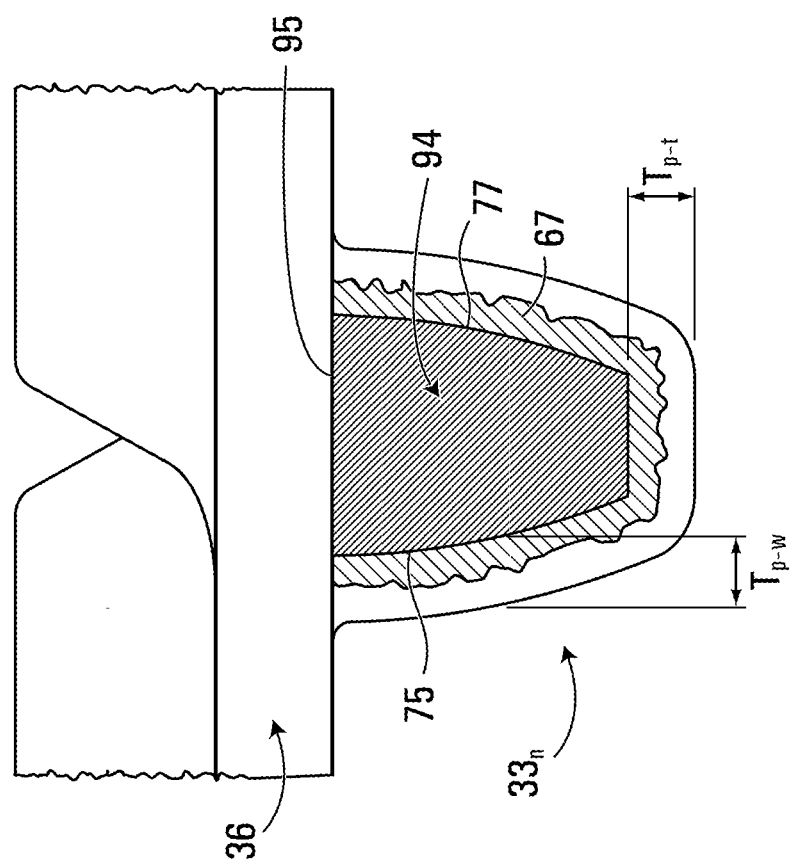
FIG. 11 shows a partial cross-sectional view of a drive projection of the endless track in accordance with yet another embodiment of the invention.

In embodiments considered above, the heat conductor 86 or the heat conductor 91 is an inner member positioned in the cavity 75 of each drive lug 33ₙ to conduct heat inside the drive lug 33ₙ during the curing process. As shown in FIG. 11, in other embodiments, each drive lug 33ₙ may comprise an inner member 94 which is not used to conduct heat inside the drive lug 33ₙ but enhances the curing process by allowing the thickness $T_{p-l}$ of the rubber 67 of the drive lug 33ₙ measured from the internal surface 77 of the rubber 67, the thickness $T_{p-w}$ of the rubber 67 of the drive lug 33ₙ measured from the internal surface 77 of the rubber 67, and/or the thickness $T_{p-t}$ of the endless track 22 measured from the internal surface 77 of the rubber 67 to be comparable to the thickness $T_b$ of the carcass 36 as discussed above. The inner member 94 may comprise material not needing to be cured during the curing process (e.g., metal, wood, ceramic, composite or hard polymer). In this case, the inner member 94 has a surface 95 interfacing with the carcass 36. The surface 95 may be textured or otherwise configured to enhance its adherence or grip on the carcass 36. In other cases, the inner member 94 may be completely enclosed by the rubber 67 of the drive lug 33ₙ (e.g., by being molded inside the drive lug 33ₙ).

Figure 12:
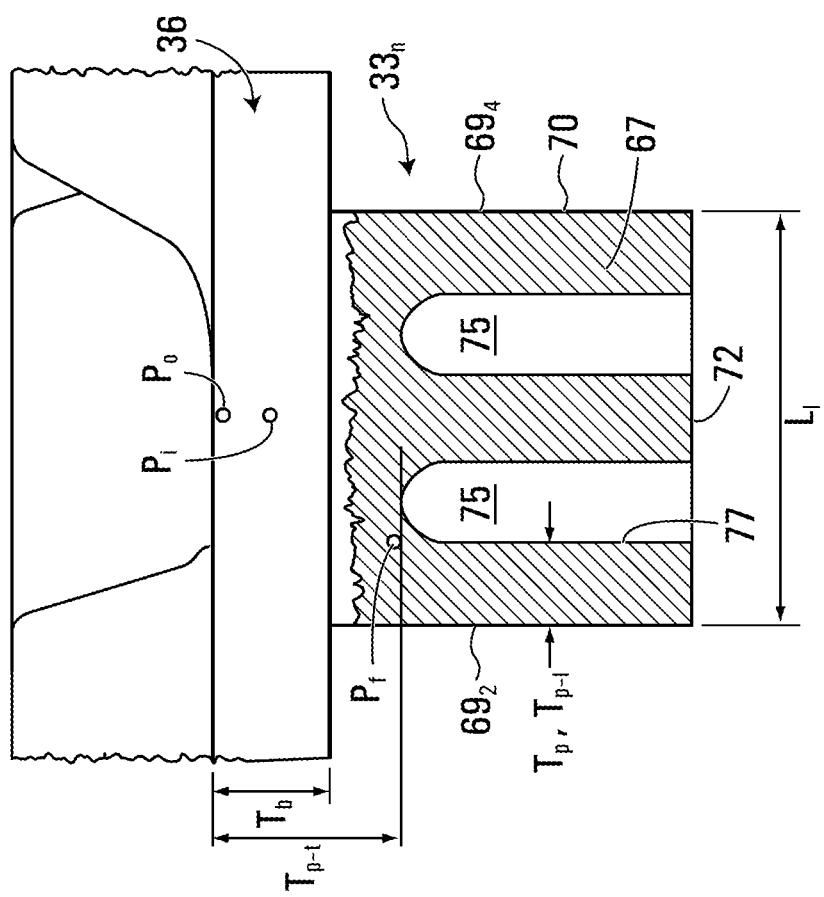
FIG. 12 shows a partial cross-sectional view of a drive projection of the endless track in accordance with yet another embodiment of the invention.

While in this embodiment the drive lug 33ₙ comprises only one (1) cavity 75, in other embodiments, the drive lug 33ₙ may comprise two (2) or more cavities such as the cavity 75 having identical or different shapes to enhance curing of the rubber of the endless track 22. For example, FIG. 12 shows an example of an embodiment in which the drive lug 33ₙ comprises a plurality of cavities 75 (in this case two cavities).

Although in this embodiment the drive lugs 33₁-33ₙ are provided with cavities 75 in their elastomeric material to enhance the curing process, in other embodiments, guide lugs which guide the endless track 22 as it is driven in motion without themselves being responsible for imparting motion to the endless track 22 may be provided with similar cavities.

Figure 13:
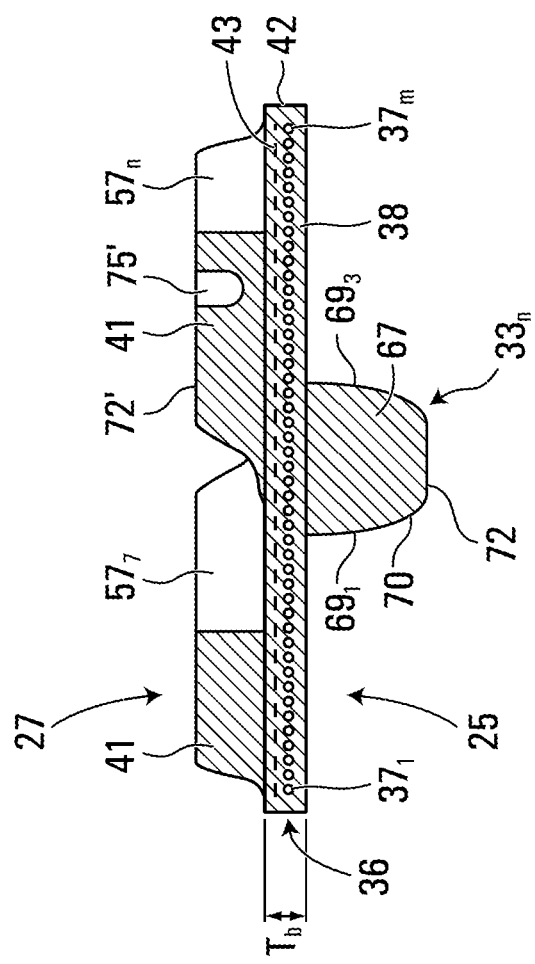
FIG. 13 shows a cross-sectional view of the endless track in accordance with yet another embodiment of the invention.
Figure 14A:
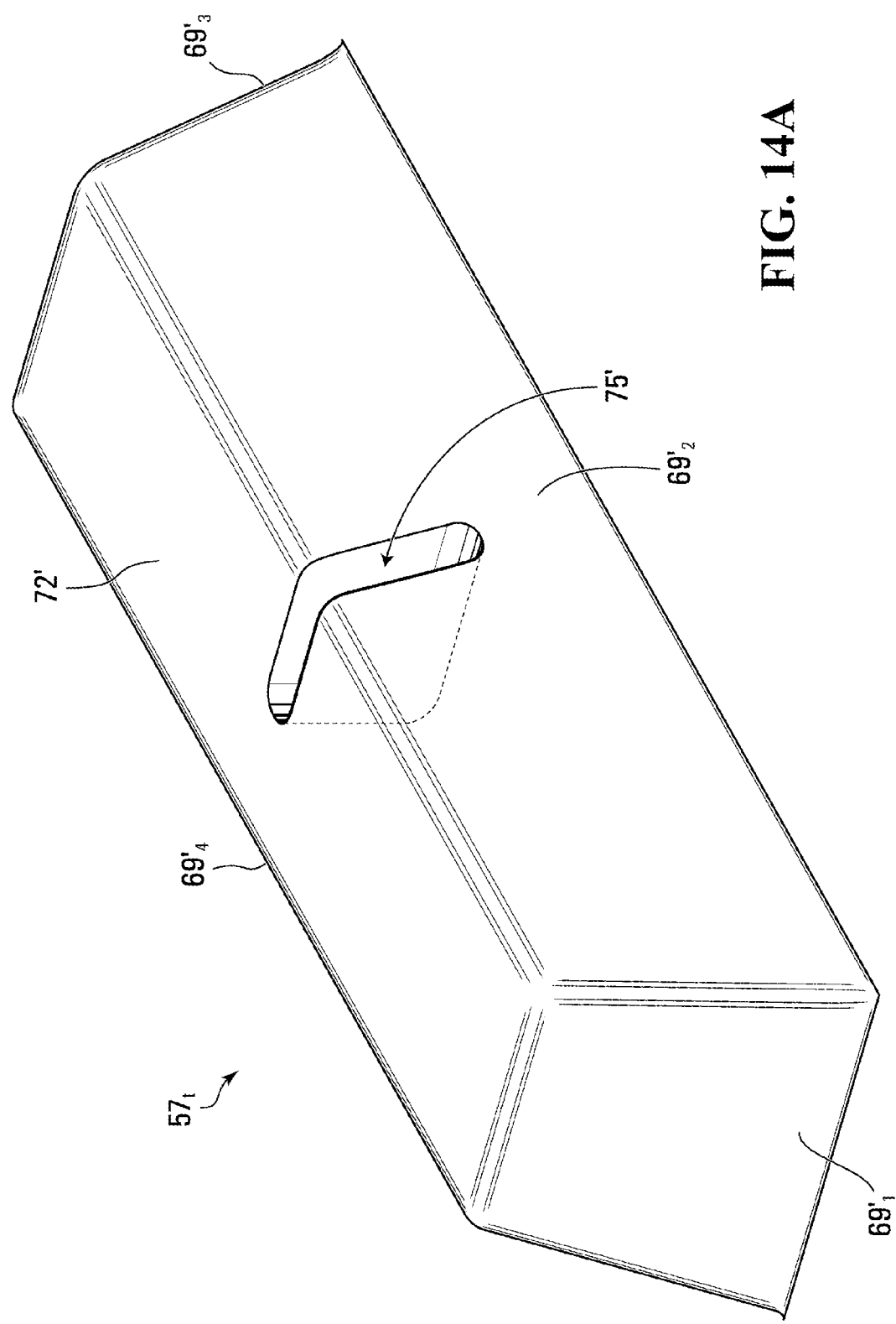
FIGS. 14A to 14D show examples of other configurations of an inner space of a traction projection in other embodiments.
Figure 14B:
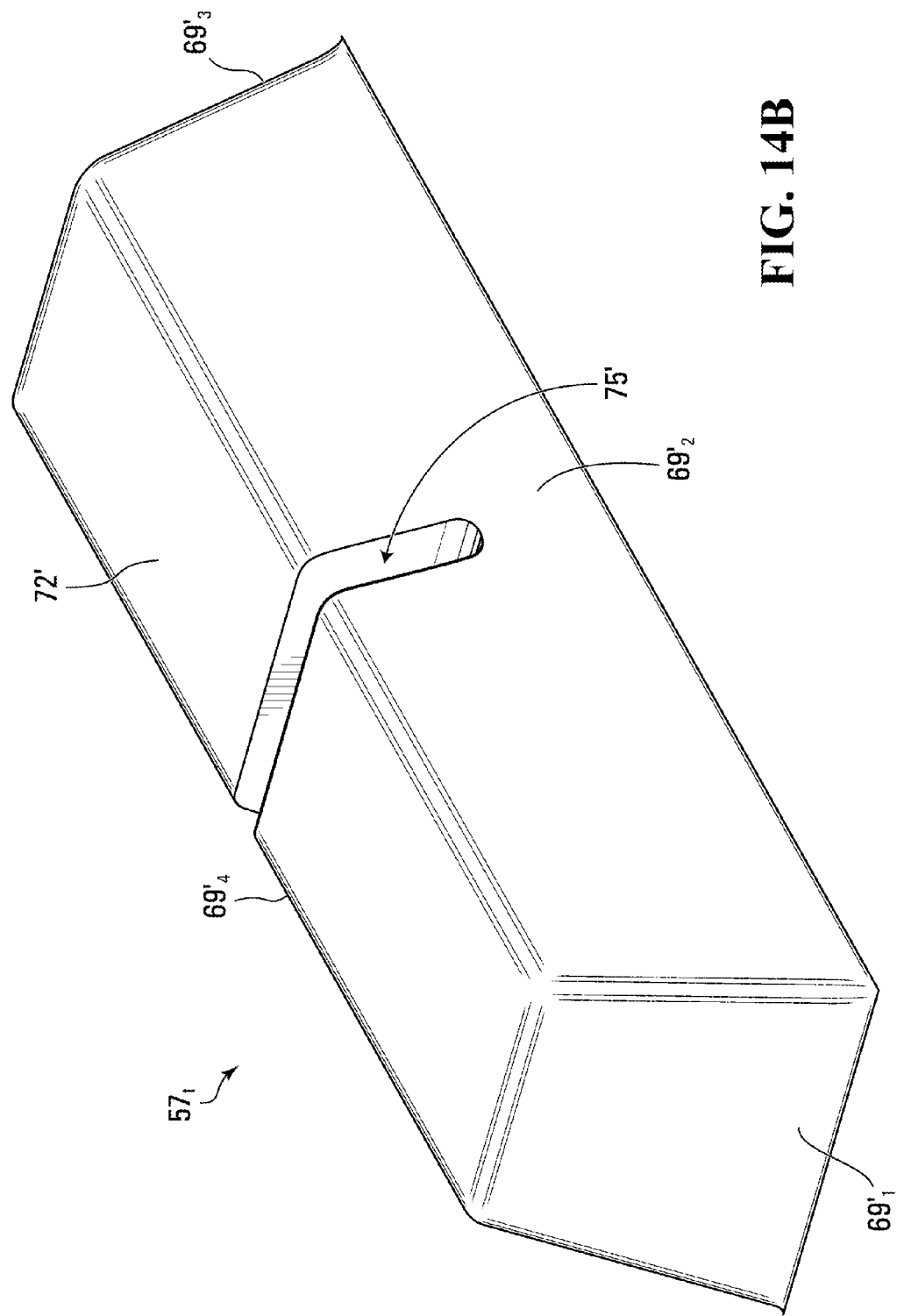
Figure 14C:
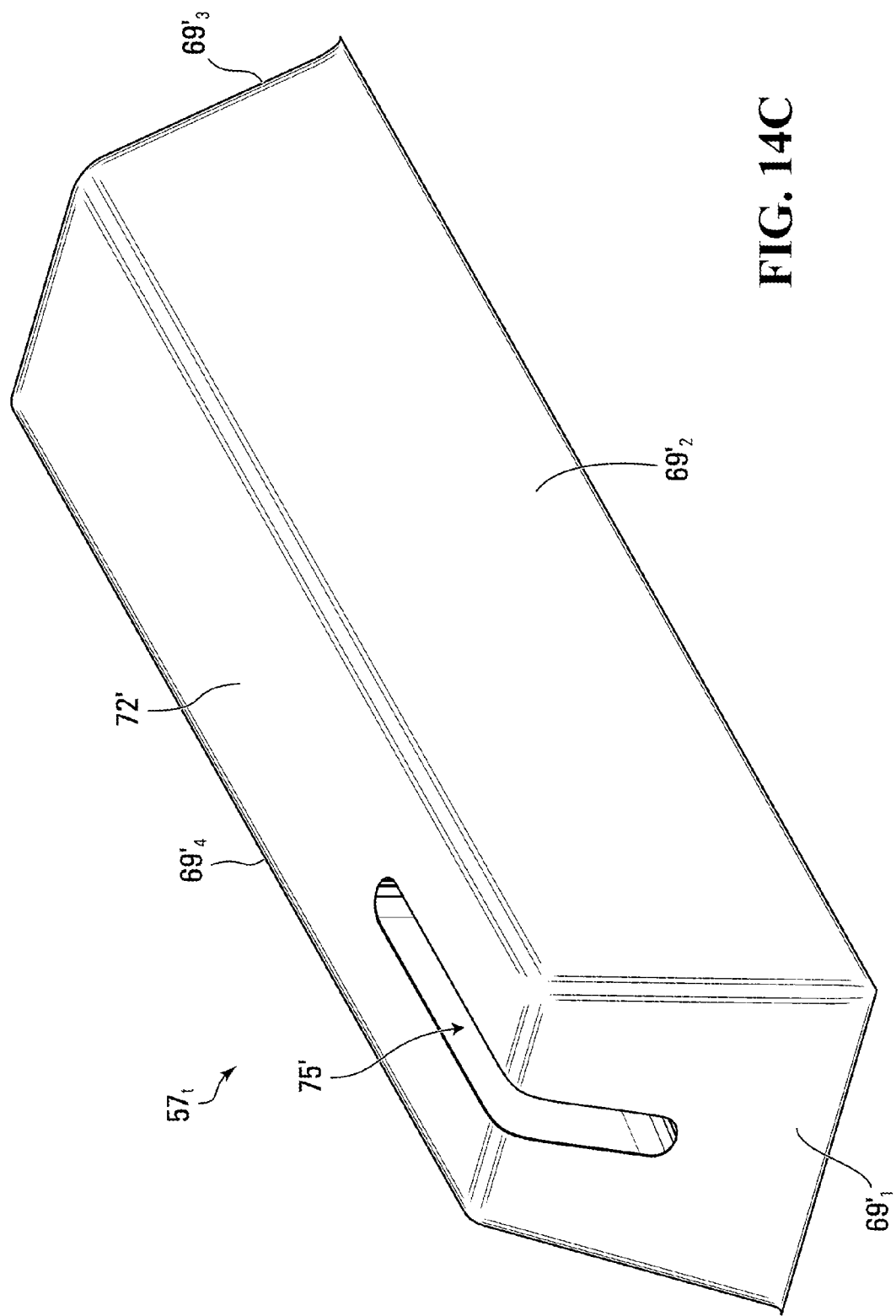
Figure 14D:
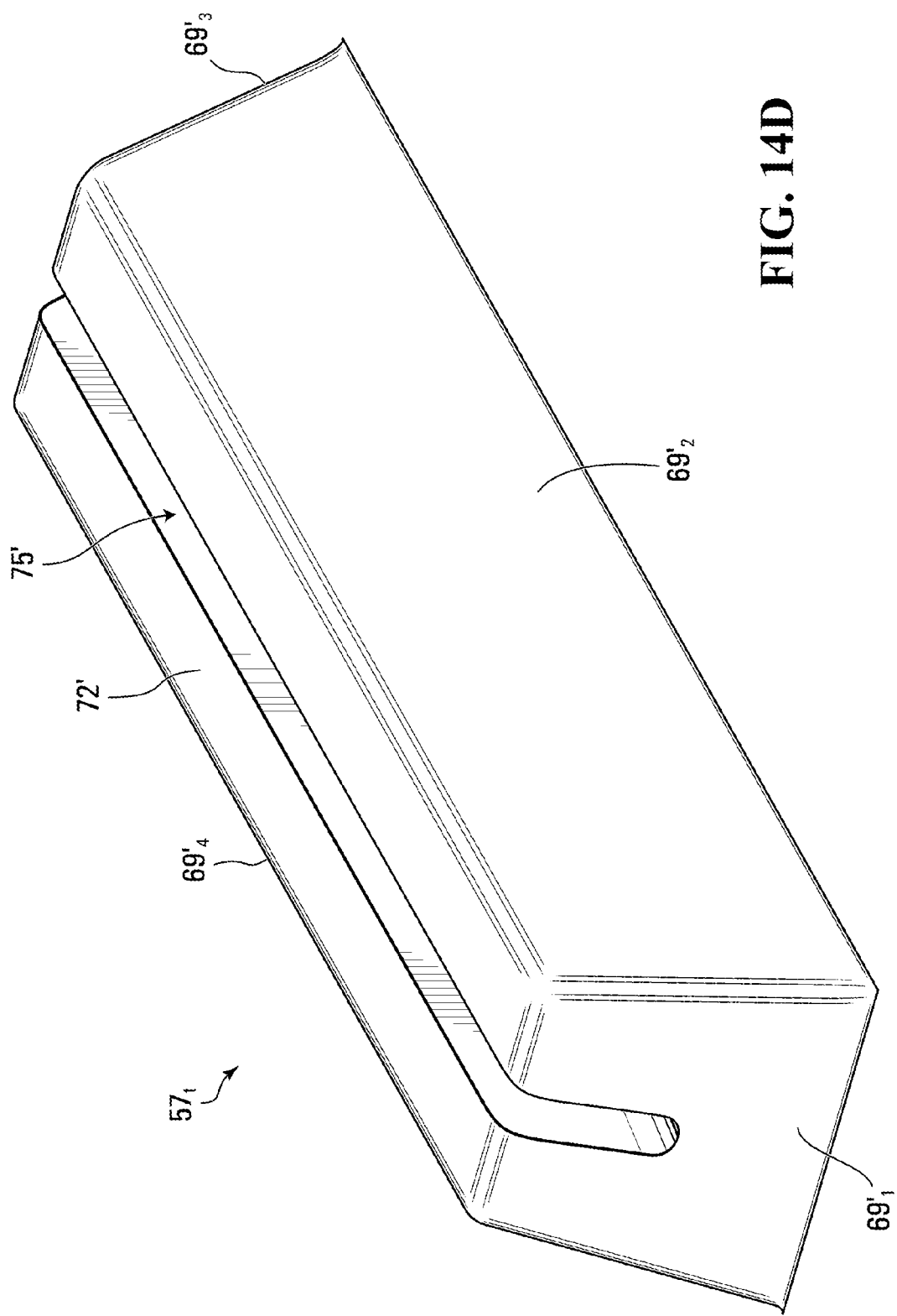

Also, in some embodiments, parts other than drive/guide lugs of the endless track 22 which comprise elastomeric material (e.g., rubber) may be provided with cavities in their elastomeric material such as the cavity 75 of each drive lug 33ₙ to enhance the curing process. For instance, in some embodiments, the traction projections 57₁-57ₜ may be provided with cavities in their rubber 41 such as the cavity 75 of each drive lug 33ₙ to enhance the curing process. It will therefore be appreciated that any discussion herein in respect of the cavities 75 of the drive lugs 33₁-33ₙ applies to cavities in the elastomeric material 41 of the traction projections 57₁-57ₜ. For instance, FIG. 13 shows an example of an embodiment in which a traction projection 57ₜ comprises a cavity 75' defined by its elastomeric material 41, while FIGS. 14A to 14B show examples of other configurations of the cavity 75' of the traction projection 57ₜ in other embodiments, as discussed above in relation to the cavity 75 of the drive lug 33ₙ. In FIG. 13, the cavity 75' extends inwardly from a top surface 72' of the traction projection 57ₜ as discussed above in relation to the cavity 75 of the drive lug 33ₙ in FIGS. 3, 5, 6A and 6B. In FIGS. 14A to 14D, the cavity 75' extends inwardly from a given one of side surfaces 69'₁-69'₄ of the traction projection 57ₜ towards, and in some cases (i.e., FIGS. 14B and 14D) to, an opposite one of the surfaces 69'₁-69'₄ of the traction projection 57ₜ as discussed above in relation to the cavity 75 of the drive lug 33ₙ in FIGS. 9A to 9D.

While in this embodiment the endless track 22 is a "one-piece" track that is not made up of interconnected track sections, in other embodiments, the endless track 22 may be a "segmented" track comprising a plurality of track sections connected to one another at a plurality of joints. In yet other embodiments, the endless track 22 may be a "one-piece" track that can be closed like a belt with connectors at both of its longitudinal ends to form a joint.

The track assembly 16ᵢ may be configured in various other ways in other embodiments. For example, in some embodiments, the track assembly 16ᵢ may comprise a front drive wheel (e.g., the idler wheel 26 may be replaced by a drive wheel) instead of or in addition to the drive wheel 24. As another example, in some embodiments, the track assembly 16ᵢ may comprise more or less roller wheels such as the roller wheels 28₁-28ᵣ. As yet another example, rather than have a generally oblong configuration as in this embodiment, in other embodiments, the track assembly 16ᵢ may have various other configurations (e.g., a generally triangular configuration).

Motion of the endless track 22 may be imparted by the drive wheel 24 in various other ways in other embodiments.

For example, in some embodiments, the endless track 22 may comprise a plurality of drive openings which can receive teeth of the drive wheel 24 in order to cause the endless track 22 to be driven, or the inner side 25 of the endless track 22 may frictionally engage the drive wheel 24 to cause the endless track 22 to be frictionally driven.

Although in this embodiment the track assembly $16_i$ and its wheels 24, 26, $28_1$-$28_R$ are designed for driving an endless track such as the endless track 22, in other embodiments, the track assembly $16_i$ may comprise wheels that were not originally designed to drive an endless track. For example, in some embodiments, the construction vehicle 10 may comprise wheels each including a tire (e.g., an off-the-road (OTR) tire), which may be pneumatic or solid and may be made of rubber and/or other materials (e.g., metals, plastics, or composites), for rolling on the ground to propel the construction vehicle 10. The endless track 22 may be mounted over the tire of each of these wheels of the construction vehicle 10 such that, as one or more of these wheels are rotated by power produced by the prime mover 14, friction between the tire of each wheel and the endless track 22 imparts motion to the endless track 22 for traction of the construction vehicle 10 on the ground. In other words, the endless track 22 may be an "over-the-tire" (OTT) track to convert the construction vehicle 10 from a wheeled vehicle into a tracked vehicle, thereby enhancing its traction and floatation on the ground.

While in embodiments considered above the vehicle 10 is a construction vehicle for performing construction work, in other embodiments, the vehicle 10 may be an agricultural vehicle (e.g., a harvester, a combine, a tractor, etc.) for performing agricultural work, a forestry vehicle (e.g., a feller-buncher, a tree chipper, a knuckleboom loader, etc.) for performing forestry work, a military vehicle (e.g., a combat engineering vehicle (CEV), etc.) for performing work in a military application, a transporter vehicle (e.g., a heavy hauler, a flatbed truck, a trailer, a carrier, etc.) for transporting equipment, materials, cargo or other objects, or any other vehicle operable off paved roads. Although it is operable off paved roads, the vehicle 10 may also be operable on paved roads. Also, while in embodiments considered above the vehicle 10 is driven by a human operator in the vehicle 10, in other embodiments, the off-road vehicle 10 may be an unmanned ground vehicle (e.g., a teleoperated or autonomous unmanned ground vehicle).

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track for traction of a vehicle, the track comprising an elastomeric body to move around a plurality of wheels, the wheels including a drive wheel to impart motion to the track, the track comprising:
  a) an inner side for facing the wheels; and
  b) a ground-engaging outer side for engaging the ground;
  wherein a given one of the inner side and the ground-engaging outer side comprises a plurality of projections spaced apart in a longitudinal direction of the track, each projection comprising:
    elastomeric material;
    a first side surface and a second side surface opposite one another and spaced apart in the longitudinal direction of the track; and
    a cavity defined by the elastomeric material and extending from the first side surface towards the second side surface, the cavity being hollow after manufacturing of the track.

2. The track claimed in claim 1, wherein the cavity extends from the first side surface to the second side surface.

3. The track claimed in claim 1, wherein the given one of the inner side and the ground-engaging outer side is the inner side and the projections are wheel-contacting projections for contacting at least one of the wheels.

4. The track claimed in claim 1, wherein the given one of the inner side and the ground-engaging outer side is the ground-engaging outer side and the projections are traction projections.

5. The track claimed in claim 4, wherein the traction projection is elongated transversally to the longitudinal direction of the track.

6. The track claimed in claim 5, wherein the traction projection defines an acute angle relative to the longitudinal direction of the track.

7. The track claimed in claim 1, wherein the cavity allows a heat conductor to be positioned in the cavity during a curing process of the track to conduct heat from the heat conductor to the elastomeric material.

8. The track claimed in claim 1, wherein the vehicle is a construction vehicle, an agricultural vehicle, a forestry vehicle, a military vehicle, or a transporter vehicle.

9. A track for traction of a vehicle, the track comprising an elastomeric body to move around a plurality of wheels, the wheels including a drive wheel to impart motion to the track, the track comprising:
  a) an inner side for facing the wheels, the inner side comprising a plurality of drive projections to engage the drive wheel; and
  b) a ground-engaging outer side for engaging the ground, the ground-engaging outer side comprising a plurality of traction projections;
  wherein each projection of a subset of the drive projections and the traction projections comprises:
    elastomeric material;
    a first side surface and a second side surface opposite one another and spaced apart in a longitudinal direction of the track; and
    a cavity defined by the elastomeric material and extending from the first side surface towards the second side surface, the cavity being hollow after manufacturing of the track.

10. The track claimed in claim 9, wherein the cavity extends from the first side surface to the second side surface.

11. The track claimed in claim 9, wherein the subset of the drive projections and the traction projections comprises the drive projections.

12. The track claimed in claim 9, wherein the subset of the drive projections and the traction projections comprises the traction projections.

13. The track claimed in claim 12, wherein the traction projection is elongated transversally to the longitudinal direction of the track.

14. The track claimed in claim 13, wherein the traction projection defines an acute angle relative to the longitudinal direction of the track.

15. The track claimed in claim 9, wherein the cavity allows a heat conductor to be positioned in the cavity during a curing process of the track to conduct heat from the heat conductor to the elastomeric material.

16. The track claimed in claim 9, wherein the vehicle is a construction vehicle, an agricultural vehicle, a forestry vehicle, a military vehicle, or a transporter vehicle.

17. A track for traction of a vehicle, the track comprising an elastomeric body to move around a plurality of wheels, the wheels including a drive wheel to impart motion to the track, the track comprising:
   a) an inner side for facing the wheels; and
   b) a ground-engaging outer side for engaging the ground, the ground-engaging outer side comprising a plurality of traction projections, each traction projection comprising:
      elastomeric material;
      a first side surface and a second side surface opposite one another and spaced apart in a longitudinal direction of the track; and
      a cavity defined by the elastomeric material and extending from the first side surface towards the second side surface, the cavity being hollow after manufacturing of the track, the cavity extending along less than half of a dimension of the traction projection in a widthwise direction of the track.

18. The track claimed in claim 17, wherein the cavity extends from the first side surface to the second side surface.

19. The track claimed in claim 17, wherein the traction projection is elongated transversally to the longitudinal direction of the track.

20. The track claimed in claim 19, wherein the traction projection defines an acute angle relative to the longitudinal direction of the track.

21. The track claimed in claim 17, wherein the cavity allows a heat conductor to be positioned in the cavity during a curing process of the track to conduct heat from the heat conductor to the elastomeric material.

22. The track claimed in claim 17, wherein the vehicle is a construction vehicle, an agricultural vehicle, a forestry vehicle, a military vehicle, or a transporter vehicle.

23. A track for traction of a vehicle, the track comprising an elastomeric body to move around a plurality of wheels, the wheels including a drive wheel to impart motion to the track, the track comprising:
   a) an inner side for facing the wheels; and
   b) a ground-engaging outer side for engaging the ground;
   wherein a given one of the inner side and the ground-engaging outer side comprises a plurality of projections spaced apart in a longitudinal direction of the track, each projection comprising:
      elastomeric material;
      a first side surface and a second side surface opposite one another and spaced apart in the longitudinal direction of the track; and
      a plurality of cavities defined by the elastomeric material and extending from the first side surface towards the second side surface, the cavities being hollow after manufacturing of the track.

24. The track claimed in claim 23, wherein each of the cavities extends from the first side surface to the second side surface.

25. The track claimed in claim 23, wherein the given one of the inner side and the ground-engaging outer side is the inner side and the projections are wheel-contacting projections for contacting at least one of the wheels.

26. The track claimed in claim 23, wherein the given one of the inner side and the ground-engaging outer side is the ground-engaging outer side and the projections are traction projections.

27. The track claimed in claim 26, wherein the traction projection is elongated transversally to the longitudinal direction of the track.

28. The track claimed in claim 27, wherein the traction projection defines an acute angle relative to the longitudinal direction of the track.

29. The track claimed in claim 23, wherein each cavity allows a heat conductor to be positioned in the cavity during a curing process of the track to conduct heat from the heat conductor to the elastomeric material.

30. The track claimed in claim 23, wherein the vehicle is a construction vehicle, an agricultural vehicle, a forestry vehicle, a military vehicle, or a transporter vehicle.

31. The track claimed in claim 1, wherein the cavity extends along less than half of a dimension of the projection in a widthwise direction of the track.

32. The track claimed in claim 9, wherein the cavity extends along less than half of a dimension of each projection of the subset of the drive projections and the traction projections in a widthwise direction of the track.

33. The track claimed in claim 23, wherein each cavity of the plurality of cavities extends along less than half of a dimension of the projection in a widthwise direction of the track.

* * * * *